(12) United States Patent
Lettkeman et al.

(10) Patent No.: US 7,572,328 B2
(45) Date of Patent: Aug. 11, 2009

(54) FAST DRYING GYPSUM PRODUCTS

(75) Inventors: Dennis M. Lettkeman, Watonga, OK (US); Qingxia Liu, Vernon Hills, IL (US); John W. Wilson, Fairview, OK (US); Brian S. Randall, Fairview, OK (US); David R. Blackburn, Barrington, IL (US); Michael P. Shake, Johnsburg, IL (US)

(73) Assignee: United States Gypsum Company, Chicago, IL (US)

( * ) Notice: Subject to any disclaimer, the term of this patent is extended or adjusted under 35 U.S.C. 154(b) by 492 days.

(21) Appl. No.: 11/152,661

(22) Filed: Jun. 14, 2005

(65) Prior Publication Data

US 2006/0281837 A1 Dec. 14, 2006

(51) Int. Cl.
*C04B 11/00* (2006.01)
(52) U.S. Cl. .................. 106/772; 106/778; 106/823; 524/5
(58) Field of Classification Search ............. 106/772, 106/778, 823; 524/5
See application file for complete search history.

(56) References Cited

U.S. PATENT DOCUMENTS

| | | | |
|---|---|---|---|
| 4,028,125 A | 6/1977 | Martin | |
| 4,202,857 A | 5/1980 | Lowe | |
| 4,238,239 A | 12/1980 | Brown | |
| 4,341,560 A | 7/1982 | Saito et al. | |
| 4,561,986 A | 12/1985 | Villa et al. | |
| 4,666,971 A | 5/1987 | Greenhalgh | |
| 4,814,014 A | 3/1989 | Arfaei | |
| 4,927,463 A | 5/1990 | Kloetzer et al. | |
| 4,960,465 A | 10/1990 | Arfaei | |
| 5,109,030 A | 4/1992 | Chao et al. | |
| 5,118,751 A | 6/1992 | Schulze et al. | |
| 5,223,036 A | 6/1993 | Koyata et al. | |
| 5,362,323 A | 11/1994 | Koyata et al. | |
| 5,369,198 A | 11/1994 | Albrecht et al. | |
| 5,387,626 A | 2/1995 | Bohme-Kovac et al. | |
| 5,393,343 A | 2/1995 | Darwin et al. | |
| 5,401,798 A | 3/1995 | Rasp et al. | |
| 5,424,099 A | 6/1995 | Stewart et al. | |
| 5,556,460 A | 9/1996 | Berke et al. | |
| 5,614,017 A | 3/1997 | Shawl | |
| 5,643,978 A | 7/1997 | Darwin et al. | |
| 5,661,206 A | 8/1997 | Tanaka et al. | |
| 5,670,578 A | 9/1997 | Shawl | |
| 5,685,903 A | 11/1997 | Stav et al. | |
| 5,703,174 A | 12/1997 | Arfaei et al. | |
| 5,725,656 A | 3/1998 | Shimanovich et al. | |
| 5,725,657 A | 3/1998 | Darwin et al. | |
| 5,739,212 A | 4/1998 | Wutz et al. | |
| 5,779,786 A | 7/1998 | Patel | |
| 5,798,425 A | 8/1998 | Albrecht et al. | |
| 5,834,576 A | 11/1998 | Nagano et al. | |
| 5,858,083 A | 1/1999 | Stav et al. | |
| 5,925,184 A | 7/1999 | Hirata et al. | |
| 5,985,989 A | 11/1999 | Shawl et al. | |
| 6,034,208 A | 3/2000 | McDaniel et al. | |
| 6,043,329 A | 3/2000 | Lepori et al. | |
| 6,150,437 A | 11/2000 | Wutz et al. | |
| 6,166,112 A | 12/2000 | Hirata et al. | |
| 6,187,887 B1 | 2/2001 | Albrecht et al. | |
| 6,211,317 B1 | 4/2001 | Albrecht et al. | |
| 6,264,739 B1 | 7/2001 | Yamato et al. | |
| 6,281,172 B1 | 8/2001 | Warren et al. | |
| 6,281,307 B1 | 8/2001 | Muhlebach et al. | |
| 6,294,015 B1 | 9/2001 | Yamashita et al. | |
| 6,376,581 B1 | 4/2002 | Tanaka et al. | |
| 6,437,027 B1 * | 8/2002 | Isomura et al. ................ 524/5 |
| 6,527,850 B2 | 3/2003 | Schwartz et al. | |
| 6,620,879 B1 | 9/2003 | Albrecht et al. | |
| 6,777,517 B1 | 8/2004 | Albrecht et al. | |
| 6,800,129 B2 | 10/2004 | Jardine et al. | |
| 6,852,159 B2 | 2/2005 | Kinoshita et al. | |
| 6,869,988 B2 | 3/2005 | Schwartz et al. | |
| 6,942,727 B2 * | 9/2005 | Daczko et al. | |
| 7,056,964 B2 * | 6/2006 | Lettkeman et al. ............. 524/5 |
| 7,070,648 B1 | 7/2006 | Schwartz et al. | |
| 2003/0019401 A1 | 1/2003 | Schwartz et al. | |
| 2003/0127026 A1 | 7/2003 | Anderson et al. | |
| 2003/0167973 A1 | 9/2003 | Peev et al. | |
| 2004/0045481 A1 | 3/2004 | Sethuraman et al. | |
| 2004/0072939 A1 | 4/2004 | Cornman et al. | |

(Continued)

FOREIGN PATENT DOCUMENTS

EP 0644165 3/1995

(Continued)

*Primary Examiner*—Paul Marcantoni
(74) *Attorney, Agent, or Firm*—Greer, Burns & Crain, Ltd.; David F. Janci, Esq.; Pradip Sahu, Esq.

(57) ABSTRACT

A slurry is made including water, at least 50% by weight calcium sulfate hemihydrate, and a specific polycarboxylate dispersant prepared using at least three repeating units. A first repeating unit is a vinyl ether-type repeating unit. A second repeating unit includes a maleic acid-type repeating unit. A third repeating unit includes an acrylic acid-type repeating unit. The polymer dispersant has a molecular weight of from about 20,000 to about 80,000 Daltons. The slurry made from this composition can be made at reduced water levels to speed drying and reduce drying costs.

9 Claims, No Drawings

U.S. PATENT DOCUMENTS

| | | | |
|---|---|---|---|
| 2004/0149172 | A1 | 8/2004 | Jardine et al. |
| 2004/0149174 | A1 | 8/2004 | Farrington et al. |
| 2004/0170873 | A1 | 9/2004 | Smith |
| 2004/0187741 | A1 | 9/2004 | Liu et al. |
| 2004/0198873 | A1 | 10/2004 | Bury et al. |
| 2004/0211342 | A1* | 10/2004 | Sprouts et al. |
| 2004/0231916 | A1 | 11/2004 | Englert et al. |
| 2005/0239924 | A1* | 10/2005 | Lettkeman et al. |
| 2006/0100355 | A1* | 5/2006 | Waser et al. |

FOREIGN PATENT DOCUMENTS

| | | |
|---|---|---|
| EP | 0725044 | 8/1996 |
| JP | 56045857 | 4/1981 |
| JP | 59025876 | 2/1984 |
| JP | 61040861 | 2/1986 |
| WO | WO 9533698 | 12/1995 |
| WO | WO 0181263 | 11/2001 |
| WO | WO 03/082765 | 10/2003 |
| WO | WO 03/082766 | 10/2003 |

* cited by examiner

FAST DRYING GYPSUM PRODUCTS

CROSS REFERENCES TO RELATED APPLICATIONS

This application is related to co-pending U.S. Ser. No. 11/152,317, entitled "Modifiers for Gypsum Products and Method of Using Them"; U.S. Ser. No. 11/152,332, entitled "Method of Making a Gypsum Slurry with Modifiers and Dispersants" and U.S. Ser. No. 11/152,404, entitled, "Effective Use of Dispersants in Wallboard Containing Foam", all filed concurrently herewith and all hereby incorporated by reference.

BACKGROUND OF THE INVENTION

This invention relates to fast-drying gypsum products. More specifically, it relates to a gypsum slurry and a wallboard that require less drying time than conventional products.

Gypsum-based building products are commonly used in construction. Wallboard made of gypsum is fire retardant and can be used in the construction of walls of almost any shape. It is used primarily as an interior wall and ceiling product. Gypsum has sound-deadening properties. It is relatively easily patched or replaced if it becomes damaged. There are a variety of decorative finishes that can be applied to the wallboard, including paint, stain and wallpaper. Even with all of these advantages, it is still a relatively inexpensive building material.

One reason for the low cost of wallboard panels is that they are manufactured by a process that is fast and efficient. A slurry, including calcium sulfate hemihydrate and water, is used to form the core, and is continuously deposited on a paper cover sheet moving beneath a mixer. A second paper cover sheet is applied thereover and the resultant assembly is formed into the shape of a panel. Calcium sulfate hemihydrate reacts with a sufficient amount of the water to convert the hemihydrate into a matrix of interlocking calcium sulfate dihydrate crystals, causing it to set and to become firm. The continuous strip thus formed is conveyed on a belt until the calcined gypsum is set, and the strip is thereafter cut to form boards of desired length, which boards are conveyed through a drying kiln to remove excess moisture. Since each of these steps takes only minutes, small changes in any of the process steps can lead to gross inefficiencies in the manufacturing process.

The amount of water added to form the slurry is in excess of that needed to complete the hydration reactions. Excess water gives the slurry sufficient fluidity to flow out of the mixer and onto the facing material to be shaped to an appropriate width and thickness. While the product is wet, it is very heavy to move and relatively fragile. The excess water is removed from the board by evaporation. If the excess water were allowed to evaporate at room temperature, it would take a great deal of space to stack and store wallboard while it was allowed to air dry or to have a conveyor long enough to provide adequate drying time. Until the board is set and relatively dry, it is somewhat fragile, so it must be protected from being crushed or damaged.

To dry the boards in a relatively short period of time, the wallboard product is usually dried by evaporating the extra water at elevated temperatures, for example, in an oven or kiln. It is relatively expensive to build and operate the kiln at elevated temperatures, particularly when the cost of fossil fuels rises. A reduction in production costs could be realized by reducing the amount of excess water present in set gypsum boards that is later removed by evaporation.

Dispersants are known for use with gypsum that help fluidize the mixture of water and calcium sulfate hemihydrate so that less water is needed to make a flowable slurry. Naphthalene sulfonate dispersants are well known, but have limited efficacy. Polycarboxylate dispersants are commonly used with cements and, to a lesser degree, with gypsum. The class of compounds represented by the term "polycarboxylate dispersants" is huge, and it is very difficult to predict how individual compounds react in different media.

Despite the large amount of prior art to polycarboxylate dispersants, it is difficult to predict the effect of any particular compound on the products with which it is used. Polycarboxylates are generally known to improve fluidity in cement. This does not necessarily mean that the polycarboxylate will produce the same result in gypsum products. Gypsum and cement form different crystal patterns that may disperse differently in a polycarboxylate solution. The set times of these hydraulic materials is very different, making the retardive effects of some polycarboxylates that are negligible in cement critical to the set of a gypsum wallboard. There are even variations within the realm of gypsum products, with some polycarboxylates being effective for certain gypsum sources and not others. The lack of predictability of polycarboxylate efficacy in gypsum or cement makes it difficult to make a low-water wallboard product given the constraints of the manufacturing process.

In addition to acting as a dispersant, polycarboxylates are known to retard the set of hydraulic slurries. Retardation in the set of a cement slurry by several minutes would have little or no effect. However, on a high-speed wallboard line, set retardation of minutes could result in board too soft to cut, too fragile to move to the kiln or even gypsum slurry seeping through the openings on the conveyor and setting on the floor. Wallboard is preferably at least 50% set when it is cut at the knife in order to withstand subsequent handling. When high dosages of polycarboxylates are used to make a flowable slurry at low water to stucco ratios, the set time can be delayed enough to require reduction in the speed of the board making line, severely reducing efficiency.

Further, retardation of the set times by the use of polycarboxylate dispersants cannot always be overcome by the addition of conventional set accelerators. The addition of set accelerators to the mixer decreases the set time, but also causes the formation of dihydrate crystals before the slurry leaves the mixer, resulting in premature thickening, reduced flowability of the slurry and ultimately loss of strength in the gypsum board. Thus, the use of set accelerators to overcome the set retardation can defeat the purpose of adding the polycarboxylate dispersant to increase flowability in the first place.

It would be an improvement if a gypsum slurry were developed from which wallboard could be made that did not require kiln drying or long drying times. Moreover, the improved slurry would dry quickly without the increase in set times associated with the use of polycarboxylate dispersants.

SUMMARY OF THE INVENTION

These and other problems associated with the use of polycarboxylate dispersants are improved by the present invention which is directed to a slurry including water, at least 50% by weight calcium sulfate hemihydrate, and a specific polycarboxylate dispersant prepared using at least three repeating units. A first repeating unit is a vinyl ether-type repeating unit. A second repeating unit includes a maleic acid-type repeating unit. A third repeating unit includes an acrylic acid-type repeating unit. The slurry made from this composition can be made at reduced water levels to speed drying and reduce drying costs. The polymer dispersant has a molecular weight of from about 20,000 to about 80,000 Daltons.

The set time of the gypsum slurry of this invention is less retarded at a constant dispersant concentration than those made with other polycarboxylate dispersants in the prior art. This helps to reduce the cost of the gypsum wallboard panel by reducing the need for set accelerators and by reducing the excess water in the slurry, with the associated decrease in drying costs. This dispersant is also more effective than other polycarboxylate compositions. The amount of polycarboxylate can be reduced and still obtain a flowable slurry. Since the dispersant is often a relatively expensive portion of the composition, manufacturing costs can be noticeably reduced.

DETAILED DESCRIPTION OF THE INVENTION

The gypsum slurry and wallboard of the present invention are made from a mixture of water, a hydraulic material that includes calcium sulfate hemihydrate and a specific polycarboxylate dispersant. This dispersant is a copolymer including acrylic acid-type repeating units, maleic acid-type repeating units and repeating units including a poly oxyalkylether repeating unit.

The hydraulic material includes any calcium sulfate hemihydrate, also known as stucco or calcined gypsum, in amounts of at least 50%. Preferably, the amount of calcium sulfate hemihydrate is at least 80%. In many wallboard formulations, the hydraulic material is substantially all calcium sulfate hemihydrate. Use of calcium sulfate anhydrite is also contemplated, although it is preferably used in small amounts of less than 20%.

Another key component of the gypsum slurry or wallboard of this invention is the specific dispersant used. The dispersants of interest are a subclass of the class of compounds further described in U.S. Pat. No. 6,777,517, herein incorporated by reference. They are copolymers containing repeating units from at least three repeating units and preferably have a molecular weight of from about 20,000 to about 80,000 Daltons. More preferably, the molecular weight of the copolymer is from about 30,000 to about 50,000 Daltons. The repeating units can be present in the copolymer in any order, including random arrangement along the polymer backbone.

The first repeating unit is an acrylic acid-type repeating unit or its derivative, shown in Formula I. $R^1$ is a hydrogen atom or an aliphatic hydrocarbon radical having from 1 to 20 carbon atoms. X is $-O_aM$, $-O-(C_mH_{2m}O)_n-R^2$, $-NH-(C_mH_{2m}O)_n-R^2$, where M is a hydrogen, a monovalent or divalent metal cation, an ammonium ion or an organic amine radical, a is ½ or 1 depending on whether M is a monovalent or divalent cation, m is 2 to 4, n is 0 to 200 and $R^2$ is a hydrogen atom, an aliphatic hydrocarbon radical having from 1 to 20 carbon atoms, a cycloaliphatic hydrocarbon radical having from 5 to 8 carbon atoms, a substituted or unsubstituted aryl radical having from 6 to 14 carbon atoms. Preferred first repeating units include acrylic acid and methacrylic acid or their monovalent or divalent metal salts. Preferred metals are sodium, potassium, calcium or ammonium.

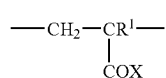

The second repeating unit is a vinyl ether-type repeating unit, shown in Formula II. $R^2$ is as described above. $R^3$ is a hydrogen atom, or an aliphatic hydrocarbon radical having from 1 to 5 carbon atoms. P is from 0 to 3, m is 2 to 4 and n is 0 to 200. Preferably, $R^2$ is a hydrogen atom or an aliphatic hydrocarbon radical having from 1 to 5 carbon atoms and p=0 to 3. The use of polyethylene glycol monovinyl ethers (p=0 and m=2) are particularly advantageous, with n preferably being from 1 to 50.

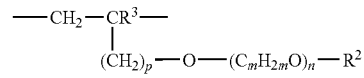

The third repeating unit is a maleic acid-type repeating unit or its ester, as shown in Formula III. In Formula III, $R^4$ is a hydrogen or an aliphatic hydrocarbon radical having from 1 to 5 carbon atoms. S is a hydrogen atom, a carboxylic acid, the acid salt containing a monovalent or divalent metal cation, an ammonium ion or an organic amine radical or the acid ester of an aliphatic hydrocarbon radical having from 3 to 20 carbon atoms, a cycloaliphatic hydrocarbon radical having from 5 to 8 carbon atoms or an aryl radial having from 6 to 14 carbon atoms. T is an acid ester of an aliphatic hydrocarbon radical having from 3 to 20 carbon atoms, a cycloaliphatic hydrocarbon radical having from 5 to 8 carbon atoms or an aryl radial having from 6 to 14 carbon atoms. Examples of preferred ester compounds include di-n-butyl maleate or fumarate or mono-n-butyl maleate or fumarate,

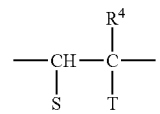

Polymerization of the monomers is carried out by any customary copolymerization method. A preferred method of making the polymer is taught in U.S. Pat. No. 6,777,517, previously incorporated by reference. Several commercially available polycarboxylate dispersants are useful in this invention. MELFLUX 2641F is a product of Degussa Construction Polymers, GmbH (Trostberg Germany) and is supplied by Degussa Corp. (Kennesaw, Ga.) (hereafter "Degussa") as the 2641 Dispersant series. (MELFLUX is a registered trademark of Degussa Construction Polymers GmbH.) It is a free flowing powder produced by spray-drying the modified polyether carboxylate.

Other preferred polycarboxylate dispersants in this series include MELFLUX 2651F and MELFLUX 2500L dispersants by Degussa and other polycarboxylate dispersants that are based on oxyalkylene-alkyl ethers, maleic acid and acrylic acid repeating units. MELFLUX 2500L is a liquid dispersant that typically contains 43-45% solids by weight in an aqueous suspension. In measuring the liquid dispersant, only the polymer solids are considered in calculating the dosage of the dispersant, and the water from the dispersant is considered when the total amount of water to be used is determined.

Many polymers can be made with the same three repeating units using different distributions of them. The ratio of the acid-containing repeating units to the vinyl ether-containing repeating unit is directly related to the charge density. Preferably, the charge density of the co-polymer is in the range of about 300 to about 3000 µequiv. charges/g co-polymer. It has been found that the most effective dispersant tested for water reduction in this class of dispersants, 2651, has the highest charge density.

However, it has also been discovered that the increase in charge density further results in an increase in the retardive effect of the dispersant. Dispersants with a low charge density, such as MELFLUX 2500L retard the set times less than the 2651 dispersant having a high charge density. Since retardation in set times increases with the increase in efficacy obtained with dispersants of high charge density, making a slurry with low water, good flowability and reasonable set times require keeping of the charge density in a mid-range. More preferably, the charge density of the co-polymer is in the range of about 600 to about 2000 µequiv. charges/g co-polymer.

It is also noted that the polycarboxylate dispersants of the present invention are sufficiently effective that they need not be combined with other dispersants. The wallboard, and the slurry from which it is made, is optionally free of naphthalene-type dispersants. However, it has been discovered that the efficacy of the dispersant is further improved by adding a portion of the dispersant to the gauge water in the mixer, and adding a portion of the dispersant into the water and soap used to make foam, which is incorporated into the gypsum slurry. In some embodiments of this invention, two different dispersants are used in the mixer and the foam, such as MELFLUX 2500L in the mixer and a naphthalene sulfonate dispersant in the foam. This method allows for control of the size of the foam bubbles and dispersant efficacy, and is claimed in co-pending U.S. Ser. No. 11/152,404, entitled, "Effective Use of Dispersants in Wallboard Containing Foam", filed concurrently herewith and previously incorporated by reference.

Water is present in any amount useful to make gypsum board panels. Sufficient water is added to the dry components to make a flowable slurry. A suitable amount of water exceeds 75% of the amount needed to hydrate all of the calcined gypsum to form calcium sulfate dihydrate. The exact amount of water is determined, at least in part, by the application with which the product will be used and the amount and type of additives used. Water content is determined, in part, by the type of calcined gypsum that is used. Alpha-calcined stucco requires less water to achieve the same flowability as beta-calcined stucco. A water-to-stucco ratio is calculated based on the weight of water compared to the weight of the dry calcined gypsum. Preferred ratios range from about 0.2:1 to about 1:1. Water usage less than that theoretically needed to hydrate the hydraulic components, about 0.19 pounds of water per pound of stucco, is contemplated for use in some embodiments of the invention.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

The polymers of this invention have increased efficacy in the presence of optional modifiers. Use of modifiers in gypsum products is disclosed in co-pending application U.S. Ser. No. 11/152,317, entitled "Modifiers for Gypsum Products and Method of Using Them", filed concurrently herewith and previously incorporated by reference. The exact function of the modifiers is unknown, but they allow the amount of polycarboxylate to be reduced at a constant water demand, thus reducing the cost and the set retardation. Lime is an optional modifier that is used in amounts from about 0.05% to about 0.5% by weight. Another example of preferred modifiers are sodium carbonate or soda ash, potassium carbonate and other modifiers that work well with the polycarboxylate without raising the pH significantly. Other carbonates, hydroxides, silicates, phosphonates, phosphates and cement are also useful as modifiers. It is unknown at this time exactly how the modifier acts to enhance the efficacy of the polycarboxylate. Preferably the modifiers and the dispersant are added to the mixer water prior to the addition of the hemihydrate. If both the modifier and the dispersant are in dry form, they can be preblended with each other and added with the stucco. Modifiers are less effective when added to the slurry after the dispersant contacts the calcined gypsum. The modifier is preferably substantially mixed with the water and dispersant prior to the calcined gypsum addition as disclosed in copending U.S. Ser. No. 11/152,323, entitled "Method of Making a Gypsum Slurry with Modifiers and Dispersants", filed concurrently herewith and previously incorporated by reference.

Another preferred method is obtaining the modifier and dispersant in dry form and premixing them with the dry stucco.

In addition to the basic gypsum slurry, the gypsum composition optionally includes additives to impart specific properties on the gypsum. Set retarders (up to about 2 lb./MSF (9.8 g/m2)) or dry accelerators (up to about 35 lb./MSF (170 g/m2)) are added to modify the rate at which the hydration reactions take place. "CSA" is a set accelerator comprising 95% calcium sulfate dihydrate co-ground with 5% sugar and heated to 250° F. (121° C.) to caramelize the sugar. CSA is available from United States Gypsum Company, Southard, Okla. plant, and is made according to U.S. Pat. No. 3,573,947, herein incorporated by reference. Potassium sulfate is another preferred accelerator. HRA is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators.

Another accelerator, known as wet gypsum accelerator, is also a preferred accelerator. Descriptions of the use of and a method for making wet gypsum accelerator are disclosed in U.S. Pat. No. 6,409,825, herein incorporated by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 g/m$^2$) of board product.

In some embodiments of the invention, additives are included in the gypsum slurry to modify one or more properties of the final product. Additives are used in the manner and amounts as are known in the art. Concentrations are reported in amounts per 1000 square feet of finished board panels ("MSF"). Starches are used in amounts from about 3 to about 20 lbs./MSF (14.6 to 97.6 g/m$^2$) to increase the density and strengthen the product. Glass fibers are optionally added to the slurry in amounts of at least 11 lb./MSF (54 g/m$^2$). Up to 15 lb./MSF (73.2 g/m$^2$) of paper fibers are also added to the slurry. Wax emulsions are added to the gypsum slurry in amounts up to 90 lbs./MSF (0.4 kg/M$^2$) to improve the water-resistency of the finished gypsum board panel.

In embodiments of the invention that employ a foaming agent to yield voids in the set gypsum-containing product to provide lighter weight, any of the conventional foaming agents known to be useful in preparing foamed set gypsum products can be employed. Many such foaming agents are well known and readily available commercially, e.g. the HYONIC line of soaps from GEO Specialty Chemicals, Ambler, Pa. Foams and a preferred method for preparing foamed gypsum products are disclosed in U.S. Pat. No. 5,683,635, herein incorporated by reference. If foam is added to the product, in addition to the portion of the dispersant that is added to the mixer, a second dispersant is optionally added to the foam water as taught in U.S. Ser. No. 11/152,404, entitled "Effective Use of Dispersants in Wallboard Containing Foam", previously incorporated by reference.

A trimetaphosphate compound is added to the gypsum slurry in some embodiments to enhance the strength of the product and to reduce sag of the set gypsum. Preferably the concentration of the trimetaphosphate compound is from about 0.07% to about 2.0% based on the weight of the calcined gypsum. Gypsum compositions including trimetaphosphate compounds are disclosed in U.S. Pat. Nos. 6,342,284 and 6,632,550, both herein incorporated by reference. Exemplary trimetaphosphate salts include sodium, potassium or lithium salts of trimetaphosphate, such as those available from Astaris, LLC., St. Louis, Mo. Care must be exercised when using trimetaphosphate with lime or other modifiers that raise the pH of the slurry. Above a pH of about 9.5, the trimetaphosphate loses its ability to strengthen the product and the slurry becomes severely retardive.

Other potential additives to the wallboard are biocides to reduce growth of mold, mildew or fungi. Depending on the biocide selected and the intended use for the wallboard, the biocide can be added to the covering, the gypsum core or both. Examples of biocides include boric acid, pyrithione salts and copper salts. Biocides can be added to either the covering or the gypsum core. When used, biocides are used in the coverings in amounts of less than 500 ppm.

In addition, the gypsum composition optionally can include a starch, such as a pregelatinized starch and/or an acid-modified starch. The inclusion of the pregelatinized starch increases the strength of the set and dried gypsum cast and minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 starch, commercially available from Lauhoff Grain Company and AMERIKOR 818 and HQM PREGEL starches, both commercially available from Archer Daniels Midland Company. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition. Starches such as USG95 (United States Gypsum Company, Chicago, Ill.) are also optionally added for core strength.

Other known additives may be used as needed to modify specific properties of the product. Sugars, such as dextrose, are used to improve the paper bond at the ends of the boards. Wax emulsions or polysiloxanes are used for water resistance. If stiffness is needed, boric acid is commonly added. Fire retardancy can be improved by the addition of vermiculite. These and other known additives are useful in the present slurry and wallboard formulations. While individual wallboard panels can be made in batch processes as are known in the art, more usually gypsum board is made in a continuous process formed into a long panel and cut into panels of desired lengths. The formed facing material is obtained and put into place to receive the gypsum slurry. Preferably, the facing material is of a width to form a continuous length of panel that requires only two cuts to make a panel with the desired finished dimensions. Any known facing material is useful in making the wallboard panels, including paper, glass mat and plastic sheeting. Preferably the facing is a multiply paper facing. The facing material is continuously fed to the board line.

The slurry is formed by mixing the dry components and the wet components together. Dry components of the slurry, the calcined gypsum and any dry additives, are blended together prior to entering the mixer. Water is measured directly into the mixer. Liquid additives are added to the water, and the mixer is activated for a short time to blend them. If one or more modifiers are used in the formulation, the modifier is preferably added to the mixer with the dispersant, prior to addition of the stucco. The dry components are added to the liquid in the mixer, and blended until the dry components are moistened.

As the water to stucco ratio drops, attention should be paid to the load placed on the mixer. Reducing the slurry water increases the viscosity of the composition during mixing. Even when a sufficient amount of dispersant is added to produce a flowable mixture, the heaviest load occurs during the initial mixing, before the dispersant has an opportunity to disperse the gypsum particles. Longer mixing times have no deleterious effect on the final product.

The slurry is then mixed to achieve a homogeneous slurry. Usually, an aqueous foam is mixed into the slurry to control the density of the resultant core material. Such an aqueous foam is usually generated by high shear mixing of an appropriate foaming agent, water and air to prior to the introduction of the resultant foam into the slurry. The foam can be inserted into the slurry in the mixer, or preferably, into the slurry as it exits the mixer in a discharge conduit. See, for example, U.S. Pat. No. 5,683,635, herein incorporated by reference. In a gypsum board plant, frequently solids and liquids are continuously added to a mixer, while the resultant slurry is continuously discharged from the mixer, and has an average residence time in the mixer of less than 30 seconds.

The slurry is continuously dispensed through one or more outlets from the mixer through a discharge conduit and deposited onto a moving conveyor carrying the facing material and formed into a panel. Another paper cover sheet is optionally placed on top of the slurry, so that the slurry is sandwiched between two moving cover sheets which become the facings of the resultant gypsum panel. The thickness of the resultant board is controlled by a forming plate, and the edges of the board are formed by appropriate mechanical devices which continuously score, fold and glue the overlapping edges of the paper. Additional guides maintain thickness and width as the setting slurry travels on a moving belt. While the shape is maintained, the calcined gypsum is maintained under conditions sufficient (i.e. temperature of less than about 120° F.) to react with a portion of the water to set and form an interlocking matrix of gypsum crystals. The board panels are then cut, trimmed and passed to dryers to dry the set but still somewhat wet boards.

Preferably, a two-stage drying process is employed. The panels are first subjected to a high temperature kiln to rapidly heat up the board and begin to drive off excess water. The temperature of the kiln and the residence time of the board vary with the thickness of the panel. By way of example, a ½-inch board (12.7 mm) is preferably dried at temperatures in excess of 300° F. (149° C.) for approximately 20 to 50 minutes. As water at the surface evaporates, additional water is drawn by capillary action from the interior of the panel to replace the surface water. The relatively rapid water movement assists migration of the starch and the pyrithione salt into the paper. A second-stage oven has temperatures less than 300° F. (149° C.) to limit calcination of the board.

In the examples that follow, slump tests were used to measure the fluidity of the sample, while stiffening and Vicat set times were used to compare the set times of the various compositions. All dry components were weighed and dry blended together. Dry components were delivered to the mixer via a loss-in-weight feeder for accuracy. The liquid components were weighed for accurate formulation and metered into the continuous mixer with a peristaltic pump.

The slurry sample was poured into a 2"×4" (5 cm×10 cm) cylinder placed on a plastic sheet, slightly overfilling the cylinder. Excess material was screeded from the top, then the cylinder was lifted up smoothly, allowing the slurry to flow out the bottom, making the patty. The patty was measured (±⅛") in two directions 90° apart, and the average reported as the patty diameter.

Draw a 300 g Vicat needle through the slurry patty in a vertical position. Continue this procedure until the time at which the slurry fails to close the groove behind the needle as it is pulled through the mass. Report the stiffening time from the time when the slurry was first collected from the mixer discharge.

References to set time refer to Vicat set time per ASTM C-472, herein incorporated by reference. The Vicat set time started from the time the when the slurry was first collected from the mixer discharge.

EXAMPLE 1 (COMPARATIVE EXAMPLE)

Four hundred grams of Southard PST stucco was measured for each sample. A dispersant that is not within the class defined by this invention was tested for flowability and retardiveness. Amounts of MELFLUX 1641F dispersant and CSA accelerator shown in Table I were added to the stucco and tumbled together to mix them prior to the addition of the water. Water according to the amounts shown in Table I was added to the stucco mixture. The composition was mixed according to the directions above. Tests for patty size and Vicat set time were performed on each of the dosages. The results are shown in Table I.

TABLE I

| Sample No. | Dispersant | CSA | WSR | Patty Size | Vicat Set Time |
|---|---|---|---|---|---|
| 1 | 0 | 0.3 g | 0.65 | 15.1 cm | 5:05 |
| 2 | 0.10% | 0.6 g | 0.54 | 13.6 cm | 5:10 |
| 3 | 0.20% | 1.5 g | 0.46 | 7.9 cm | 4:00 |
| 4 | 0.30% | 3.75 g | 0.43 | Not fluid | 3:15 |

As shown above, both the fluidity and the set time decreased as the concentration of the dispersant increased.

EXAMPLE 2

The same procedures used for Example 1 above were used to test three dispersants of this invention. Results, including those for the MELFLUX 2500L dispersant, are shown in Table II.

TABLE II

| Sample No. | Dispersant | CSA | WSR | Patty Size | Vicat Set Time |
|---|---|---|---|---|---|
| | MELFLUX 2641F | | | | |
| 5 | 0.10% | 0.6 g | 0.54 | 17.7 | 5:05 |
| 6 | 0.20% | 1.5 g | 0.46 | 16.51 | 4:45 |
| 7 | 0.30% | 3.75 g | 0.43 | 14.6 | 4:40 |
| | MELFLUX 2651F | | | | |
| 8 | 0.1% | 0.6 g | 0.54. | 16.43 | 5:30 |
| 9 | 0.2% | 1.5 g. | 0.46. | 20.34 | 4:50 |
| 10 | 0.3% | 3.75 | 0.43. | 21.3 | 5:40 |
| | MELFLUX 2500L | | | | |
| 11 | 0.10 | 0.6 g | 0.54 | 19.2 | 4:50 |
| 12 | 0.20 | 1.5 g | 0.46. | 19.6 | 4:50 |
| 13 | 0.30 | 3.75 | 0.43 | 19.7 | 4:20 |

As shown above, the 2641 and 2651 dispersants are as good as, or better than, the base MELFLUX 2500L dispersant and better than the MELFLUX 1641F dispersant of the comparative example in its ability to make a highly fluid mixture without significantly increasing the set times.

EXAMPLE 3

Table III below shows the formulations of gypsum wallboard panels formulated with and without the three repeating unit dispersant of the present invention. Formulations for ½" boards with and without the dispersant are shown. Unless otherwise noted, the amounts of the components are listed in pounds per 1000 square feet of board product ("MSF"). Metric equivalents in grams per square meter are reported in parenthesis beside the English units.

TABLE III

| Component | ½" Board | ½" Board |
|---|---|---|
| Stucco | 1180 (5761) | 1144 (5586) |
| Gauging Water | 848 (4140) | 738 (3603) |
| WSR | 0.81 | 0.75 |
| Total Water | 952 (4648) | 853 (4165) |
| Soap | 0.28 (1.37) | 0.29 (1.42) |
| Ground Gypsum Accelerator | 16 (78) | 17 (83) |
| Starch | 5 (24.4) | 5 (24.4) |
| USG95 | 1 (4.9) | 1 (4.9) |
| Naphthalene Sulfonate | 0 (0) | 0 |
| MELFLUX 2500L Polycarboxylate | 0 | 1.1 (5.4) |
| Paper Fiber | 5 (24.4) | 5 (24.4) |
| Glass Fiber | 0 | 0 |
| Trimetaphosphate | 0.6 (2.9) | 0.6 (2.9) |

As can be seen in the above formulations, use of a three-repeating unit system allows wallboard to be formulated with reduced water demand, thus reducing energy costs for drying.

EXAMPLE 4

The effect of polycarboxylates varies with the particular stucco with which it is used. Table IV shows the reaction of gypsum slurries from a variety of gypsum sources to the polycarboxylate of this invention. MELFLUX 2500L was used with various gypsums to determine the WSR needed to make a slurry of a given flowability as measured by the patty test.

For each test, 400 grams of stucco were mixed with CSA and MELFLUX 2500L dispersant. Sufficient water was added to make a patty 20 cm in diameter. After addition, a timer was started and the water and dry components were allowed to soak for 15 seconds in a laboratory blender, then mixed for 15 seconds. A 2"×4" slump cylinder in the automated tester was filled with the sample, along with a wax lined cup for Vicat set determination.

The top of the cylinder was screeded to level it and the cylinder was lifted to allow the slurry to flow freely on a smooth surface. When the patty stopped flowing, the diameter was measured in two directions and the average to the nearest 0.1 cm was recorded as the result. Meanwhile draw the Vicat needle through the slurry until the slurry fails to close the groove behind the needle as it is pulled through the mass. Report the stiffening time from the time when the plaster and water first came into contact until the slurry fails to fill the groove. Continue monitoring the slurry until the Vicat set time, as described above, is reached.

For each stucco source, the tests were conducted at 0%, 0.1%, 0.3% and 0.5% dispersant on a dry weight basis. At each dispersant level, the amount of water and CSA was varied to maintain a constant patty size, ±⅛", and a stiffening rate of 2 minutes, ±15 seconds.

The results are given in Table IV below.

TABLE IV

| Stucco | WSR at 0.0% Dispersant | WSR at 0.1% Dispersant | WSR at 0.3% Dispersant | WSR at 0.5% Dispersant |
|---|---|---|---|---|
| Southard | 0.65 | 0.48 | 0.38 | 0.36 |
| Galena Park | 0.65 | 0.50 | 0.36 | 0.33 |
| Shoals | 0.70 | 0.62 | 0.46 | 0.40 |
| East Chicago | 0.70 | 0.63 | 0.52 | 0.46 |
| Ranier | 0.78 | 0.78 | 0.65 | 0.59 |
| Detroit | 0.80 | 0.78 | 0.54 | 0.46 |

As can be seen from the data above, there is great unpredictability in the reaction of various stuccos to a single dispersant. Of the six stucco sources tested, two reduced the WSR by about 25% by adding 0.1% of the dispersant of this invention. Two of the stuccos tested, Detroit and Ranier, showed almost no reaction to the addition of 0.1% of the MELFLUX 2500L dispersant. The Detroit stucco went on to produce the largest change in WSR between 0.1% and 0.3% dispersant and also the largest overall change (between 0% dispersant and 0.3% dispersant). Addition of 0.3% of the MELFLUX 2500L dispersant allows the WSR to be reduced 0.34 in the Detroit stucco, but allows only a 0.24 WSR reduction in East Chicago stucco.

While a particular embodiment of the composition for a gypsum slurry and wallboard made with it has been shown and described, it will be appreciated by those skilled in the art that changes and modifications may be made thereto without departing from the invention in its broader aspects and as set forth in the following claims.

What is claimed is:

1. A gypsum slurry comprising:
water;
a hydraulic material comprising at least 50% calcium sulfate hemihydrate; and
a polycarboxylate dispersant co-polymer having a molecular weight in the range of 20,000 to 80,000 Daltons, comprising a vinyl ether repeating unit, an acrylic acid repeating unit and a maleic acid repeating unit.

2. The slurry of claim 1, wherein said hydraulic material comprises at least 80% calcium sulfate hemihydrate by weight.

3. The slurry of claim 1 wherein said hydraulic material consists essentially of calcium sulfate hemihydrate.

4. The slurry of claim 1 wherein said slurry further comprises wet gypsum accelerator.

5. The slurry of claim 1 wherein said repeating units are bonded together in random order to form said polycarboxylate dispersant co-polymer.

6. The slurry of claim 1 wherein the charge density of said polycarboxylate dispersant co-polymer is in the range of 300 to 3000 μequiv. charges/g co-polymer.

7. The slurry of claim 6 wherein said charge density is in the range of 600 to 2,000 μequiv charges/g co-polymer.

8. The slurry of claim 1 wherein said slurry is free of naphthalene dispersants.

9. The slurry of claim 1 wherein the molecular weight is in the range of 30,000 to 50,000 Daltons.

* * * * *

UNITED STATES PATENT AND TRADEMARK OFFICE
CERTIFICATE OF CORRECTION

PATENT NO. : 7,572,328 B2
APPLICATION NO. : 11/152661
DATED : August 11, 2009
INVENTOR(S) : Dennis M. Lettkeman It is certified that error appears in the above-identified patent and that said Letters Patent is hereby corrected as shown below:

On the Title Page,

Item (56)   References Cited

U.S. PATENT DOCUMENTS
Page 1, Second Column, line 9

Please delete "6,211,317" and insert

--6,221,317-- in its place.

Signed and Sealed this

Fifth Day of October, 2010

David J. Kappos
*Director of the United States Patent and Trademark Office*